Aug. 24, 1926.  
J. UKLENKOTT  
1,596,905  
WEIGHING AND DUMPING PLATFORM MECHANISM  
Filed May 19, 1923  
5 Sheets-Sheet 3
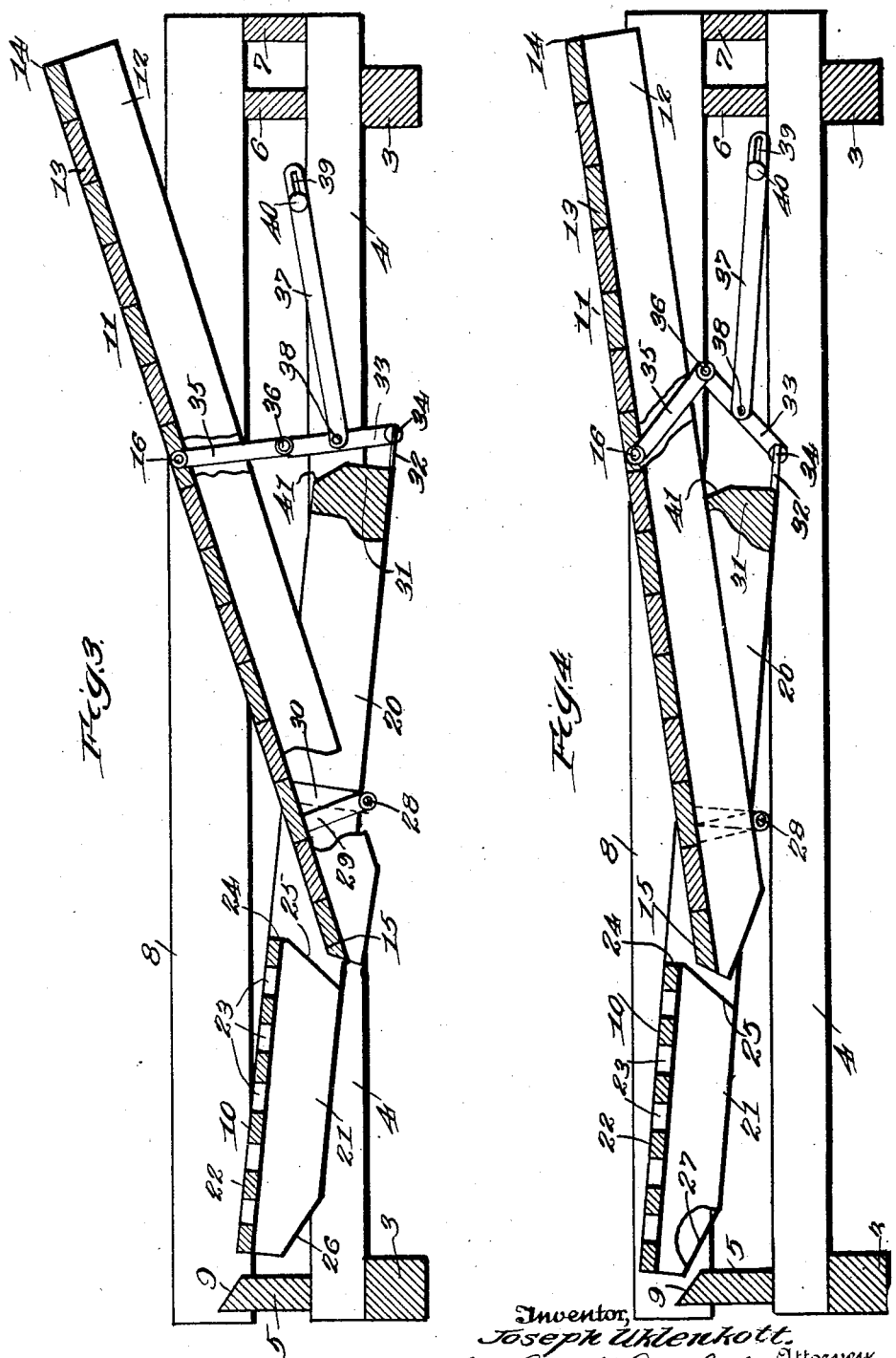
Inventor,
Joseph Uklenkott.
By Carl M. Crawford Attorney Aug. 24, 1926. 1,596,905
J. UKLENKOTT
WEIGHING AND DUMPING PLATFORM MECHANISM
Filed May 19, 1923 5 Sheets-Sheet 4
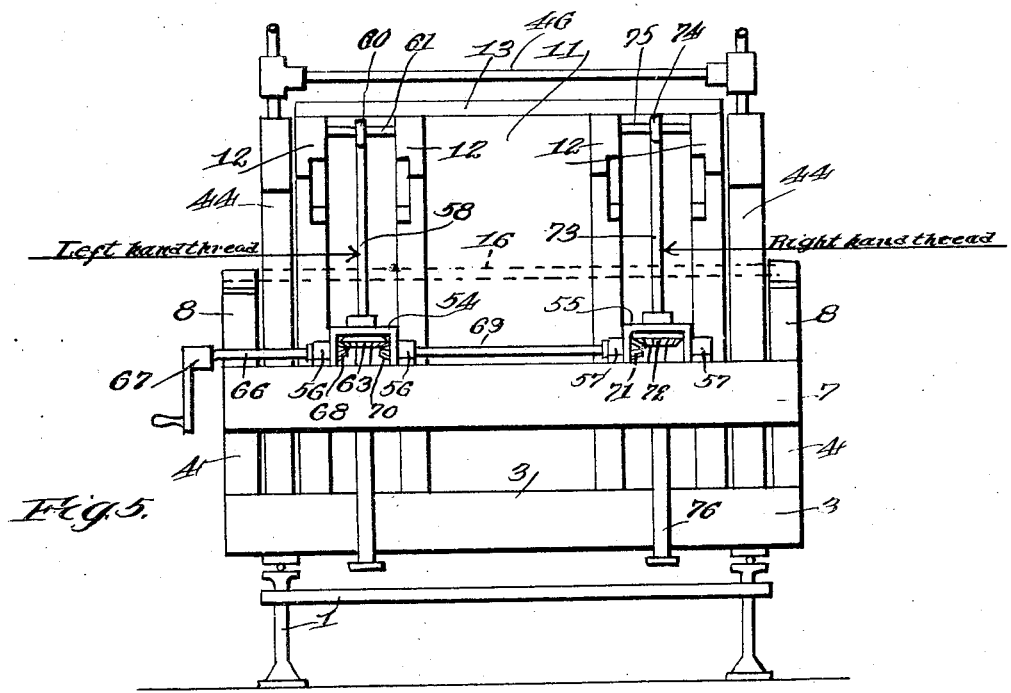

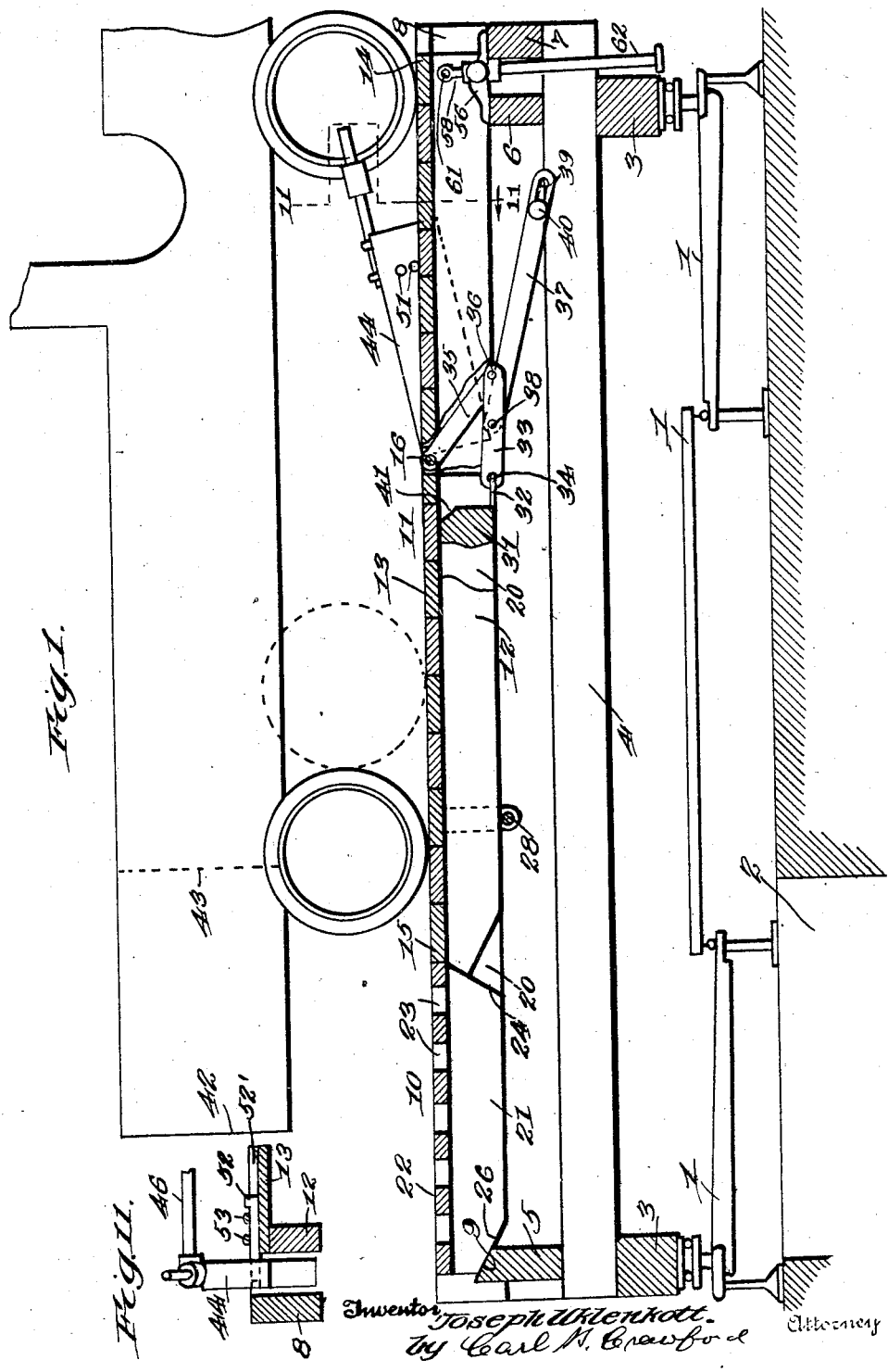

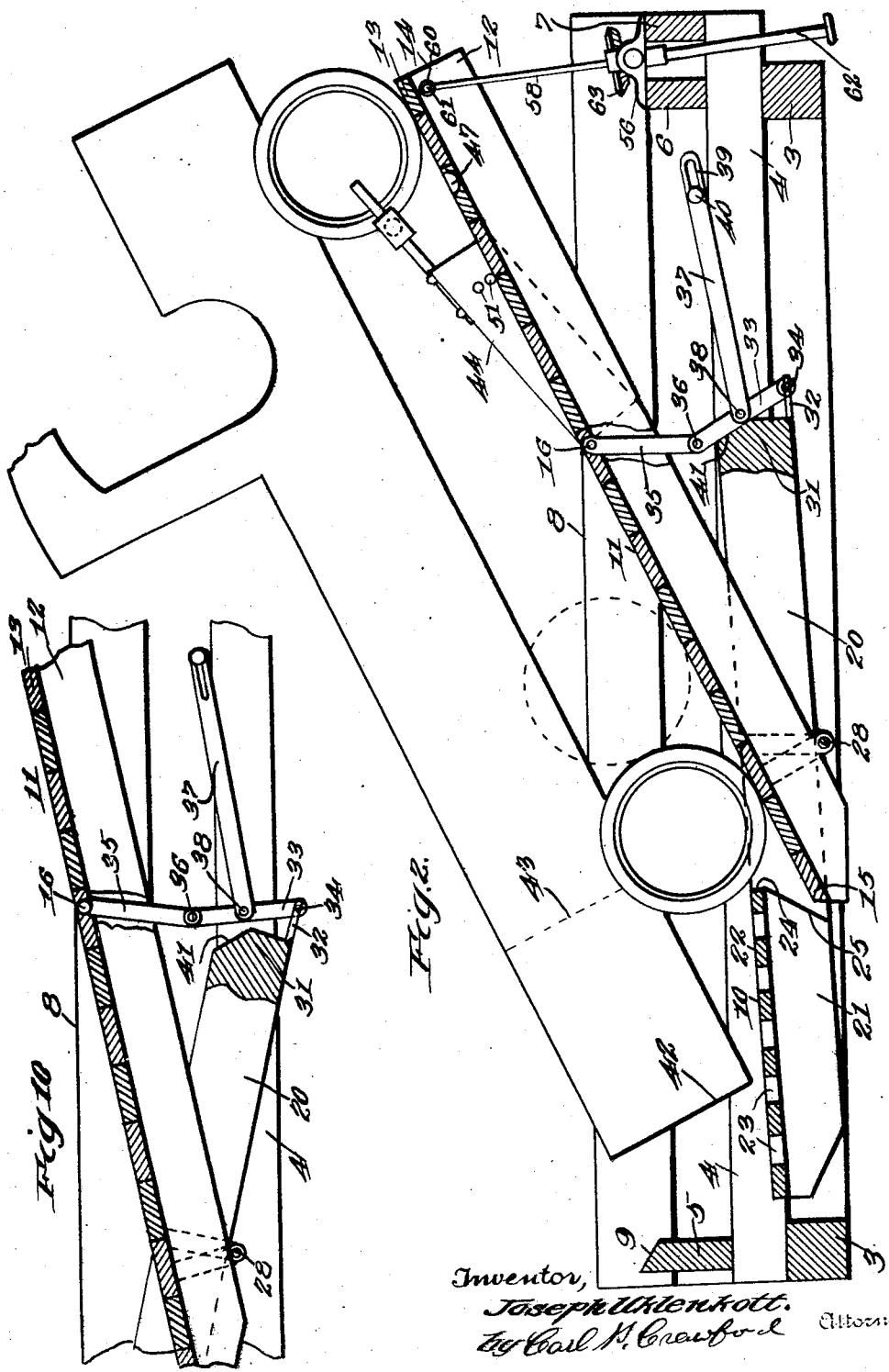

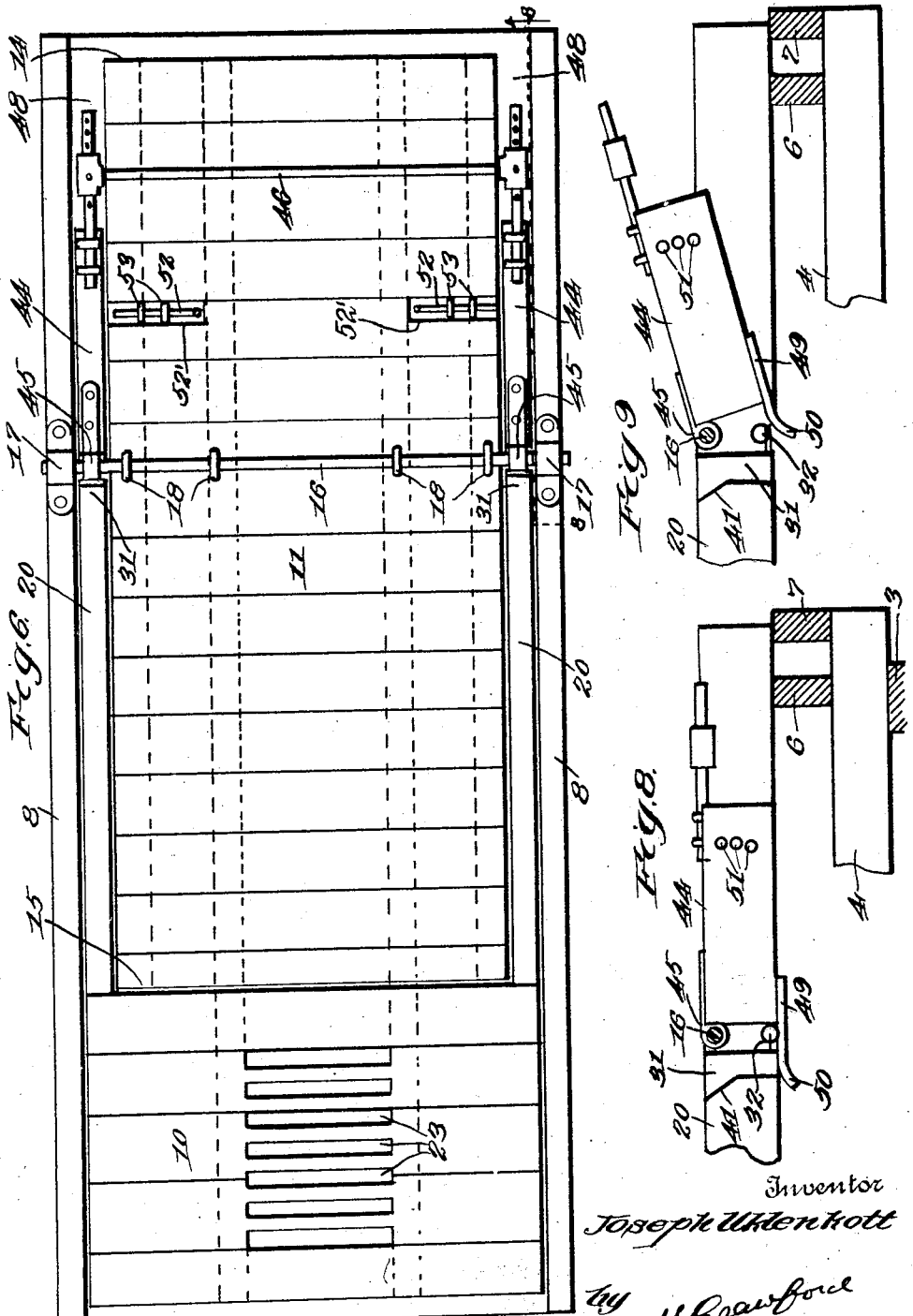

Patented Aug. 24, 1926.

1,596,905

UNITED STATES PATENT OFFICE.

JOSEPH UKLENKOTT, OF COTTONWOOD, IDAHO.

WEIGHING AND DUMPING PLATFORM MECHANISM.

Application filed May 19, 1923. Serial No. 640,193.

This invention relates to combined truck and wagon dumping and weighing platform structures.

My invention includes companion sections, adapted when in a normal or horizontal position, to form a run-way onto which a loaded truck or wagon may be advanced to be weighed and then dumped. In the most improved embodiment, one of said sections is a clearance section and the remaining section is the dumping and truck or wagon supporting section.

Heretofore, mechanism of this character has employed a platform of one length for shorter vehicles such as horse drawn wagons, and either an extension or a platform of another length for longer vehicles such as trucks. This is true irrespective of whether a clearance section was employed.

Now it is a special feature of my invention to provide a single vehicle platform section for supporting the relatively short wagons and the relatively long trucks both during weighing and dumping, thereby avoiding the complication and cost of either extensions or a plurality of platform sections.

In combination with this single platform idea, is the feature of always anchoring the wagon or truck, irrespective of the length thereof, in a fixed position with respect to the ascending end of the platform. By means of this construction, I avoid the necessity of first advancing the horses off from the platform, to weigh, and then backing the team to dispose the wagon onto the shorter dumping platform for dumping purposes, as is necessary in constructions prior to mine.

My invention includes a clearance section, in combination with a single vehicle platform section, and the latter and said clearance section move about a single major fixed axis when being shifted into and out of dumping positions. A further feature resides in pivotally mounting the clearance section on the platform section and positively controlling the position of the clearance section during dumping and restoring positions. Therefore, while the clearance section moves about said major fixed axis, it also moves about the secondary axis, namely, the axis of the pivotal connection of said clearance section with the platform section.

My improved vehicle holding mechanism is also designed to perform a safety function in that it will lock the sections against tilting movement when said mechanism is in a non-vehicle holding position and will release said sections for tilting movement when said mechanism is adjusted into a vehicle holding position. Thus, the elevating mechanism cannot be started until the vehicle is securely anchored on the tilting platform.

These dumping platform structures are usually located in a position to cause delivery of the dumped contents into a subjacent pit, and it is a feature of my invention to automatically control and actuate the clearance section in synchronism with the dumping platform so that when the latter approaches a dumping position, the clearance section will not only retract so as not to interfere with descent of the rear end of the vehicle box, but will also preferably move into a position in superposed relation to the pit so that the grain will pass through the clearance section when discharging into the pit.

My invention has many other features of novelty which will be more fully described in connection with the accompanying drawings and which will be more particularly pointed out in and by the appended claims.

In the drawings:—

Fig. 1 is a longitudinal vertical sectional view of one form of my dumping platform showing the sections in a horizontal or runway forming position and illustrating the position in which a truck would assume when anchored to the supporting section.

Fig. 2 is a similar view showing the positions assumed by the sections and truck when in a dumping position.

Fig. 3 is a similar view with the sections in an intermediate position either approaching a dumping or restoring position.

Fig. 4 is a similar view showing the position of the sections as they are just leaving a horizontal position or as they are just about to be restored thereto, details being omitted.

Fig. 5 is an end view looking from the right of Fig. 2, and more particularly illustrating the elevating and restoring means.

Fig. 6 is a plan view with the vehicle anchoring mechanism in a retracted or section locking position.

Fig. 7 is an enlarged sectional view of one of the screw and gear units forming a part of the elevating and restoring means.

Fig. 8 is a sectional view on line 8—8 of Fig. 6, showing how the vehicle anchoring mechanism locks the sections when said mechanism is in a retracted or non-vehicle holding adjustment.

Fig. 9 is a similar view showing how the sections are released when said mechanism is adjusted into a vehicle holding position.

Fig. 10 is a sectional view similar to Figs. 3 and 4. showing the positions the parts will take in being restored to normal.

Fig 11 is a sectional view on line 11—11 of Fig. 1.

Like characters of reference designate similar parts throughout the different figures of the drawings.

I have illustrated the device of my invention in connection with a weighing scale structure generally designated at 1, a pit being shown at 2. A supporting frame is mounted on the scale structure and may as shown consist of lower transverse members 3, lateral longitudinal members 4, and section supporting transverse members 5, 6 and 7. Upper lateral and longitudinal members 8, have their tops flush, or substantially so, with the run-way sections when the latter are in a normal position. The member 5, which supports the outer end of the clearance section, is inwardly inclined as shown at 9, but the member 6 and 7, which support the elevating end of the supporting section, and which, for patentable purposes can be considered as one member, are flat on top.

The clearance section is generally indicated at 10, and the tilting section at 11, which sections I will next describe in detail.

The tilting or supporting section 11 is a rectangular platform section formed of longitudinal timbers 12, capped by a suitable flooring 13. The ascending end of said section is indicated at 14, and the descending end at 15. This arbitrary designation is made to facilitate a subsequent description of operation, although it will be understood that end 14, descends when the section 11, is restored to normal, and the end 15, ascends during such restoration. The timbers 12, rest upon and are supported on members 6 and 7, when section 11 is in a horizontal position, as regards the right hand end of said section. Intermediate its ends, a supporting rod 16 extends transversely across section 11, the ends of said rod being journalled in bearings 17, fixed to timbers 8. Rod 16 is suitably secured to section 11, as indicated at 18, to form a supporting as well as a tilting connection. It will be noted that this rod is disposed nearer end 14 than end 15, of section 11, so that the normal tendency of section 11 is to tilt toward the position shown in Fig. 2. However, the rod 16, is located nearer the center of platform 11, than to either end thereof so that the weight will be so nearly counter-balanced that less power is required to tilt the platform than if the rod 16 were located relatively close to either end of the platform. Further, by this location of rod 16, substantially centrally of the platform 11, I obtain a maximum incline sufficiently to dump the grain by gravity, and still do not elevate end 13 so high as to necessitate un-hitching a team when the wagon is in a dumping position. It will also be seen that the width of section 11 is not equal to the space between timbers 8.

The clearance section 10, consists of relatively long side timbers 20, and relatively short central timbers 21, on which a flooring 22 is carried. This flooring is suitably slotted at 23, for passage of the grain therethrough, as will be later described. The timbers 21, at the abutting end 24, are inclined to recede away from the abutting end 19, of section 11, as indicated at 25. The remaining ends of timbers 20 and 21, are chamfered off at 26 and 27, respectively, to rest upon the inclined upper face 9, of the clearance supporting beam 5. The beams 20, extend along side section 11, to approximately the rod 16, and thus it will be seen that section 10, is forked, the purpose of which will presently appear.

I will next describe the operative connections between sections 10 and 11, whereby movement of one thereof will cause a synchronous but different character of movement of the other of said sections.

A supporting and pivot rod 28, is pivotally connected by straps 29, to timbers 12, of section 11, and by straps 30, with timbers 20, of section 10. Thus, it will be clear that sections 10 and 11 are pivotally connected. If this single pivotal connection alone were relied upon, section 10 would be free to tilt without restraint. Therefore, I provide controlling means, preferably of a toggle nature for attachment to the free ends 31 of timbers 20.

As shown, the ends 31 have connectors 32, to the outside faces of which lower toggle members 33, are pivoted at 34. An upper toggle member 35, is hung from rod 16, and said toggle members 33 and 35 are pivotally connected at 36. A floating bar 37, is pivoted to member 33, at 38, and the remaining end is slotted at 39. A headed stationary pin 40, carried by the frame, extends through slot 39. A portion 41, of end 31, is inclined to form an abutment for toggle member 33, as will be seen by reference to Fig. 2. It may be stated that the toggles are disposed between members 20, and the side members 8.

Now I will describe the action of the sections 10 and 11, in being lowered to a dumping position and in being restored to a normal position.

Starting with Fig. 1, it will be seen that the combined length of sections 10 and 11, exceeds the distance between supporting members 5 and 6, hence to shift said sections into a dumping position, it will be necessary to contract said sections. The parts being in the position shown in Fig. 1, stress is applied by the actuating mechanism, to be later described, to elevate end 14. The section 11, moving into the position shown in Fig. 4, will first shift section 10, inwardly by reason of pivot 28, moving about rod 16, as a center. The weight, or rather overweight of the floored end of section 10, as compared to the weight of members 20, will tend to swing the latter upwardly, seeking to cause the toggle to assume the position shown in Fig. 1. However, this is prevented by bar 37, the left hand end of slot 39, of which is fulcrumed on stud 40, thereby holding the toggle from collapsing. As the section 11, continues its tilting movement, as shown in Fig. 3, the toggle has straightened by reason of the fact that pivot 34, has not only descended, with respect to the position shown in Fig. 4, but has reached a position nearer stud 40. At the position shown in Fig. 3, the toggle is in compression in supporting section 10, in the position shown. Further downward movement to the position shown in Fig. 2, causes the toggle to pass a dead center and break into abutment against 41, which arrests further breaking movement of the toggle. It will be noted that the left hand end of slot 39, is still engaged with stud 40. Thus, the overweight of the floored end of section 10, now still seeks to elevate ends 31, which is counteracted by the toggle which is locked in the position shown. Now, it will be seen that even the longest truck can be tilted into the position shown in Fig. 2, and the section 10, will recede out of contact with the descending end of the box 42. This retraction of section 10, alone, constitutes a phase of my invention, as claimed. However, in addition thereto, it is an advantage to obtain a retractive movement of section 10 into superposed relation to pit 2, and into intercepting relation to the grain descending from box 42, into pit 2. The slots 23, permit the grain to pass through, but will catch a horse shoe, a bag, or other foreign object that might otherwise be accidentally discharged into the pit. Further, section 10, forms a convenient platform on which a man can stand, and sweep all the grain into the pit before the sections are restored.

In Fig. 2, I have shown a long wheel base truck, in full lines, and in dotted lines, at 43, I have indicated the rear end of a wagon box on a very much shorter wheel base vehicle. Thus, in either event, the slope is sufficient to cause all the grain to discharge by gravity, and onto the section 10. I will later explain the manner of holding the vehicle on section 11, in the novel manner by means of which this advantage is obtained.

In the return movement from Fig. 2, the toggle member 33 continues to engage abutment 41 until the lost motion is taken up by the slot 39 traversing stud 40 whereupon the right hand end of slot 39, shown in Fig. 10, engages stud 40. Then, member 33, can no longer follow movement of section 10 to the left of Fig. 2. Now it will be seen that throughout the descending movement of the sections, the left hand end of slot 39, will fulcrum on stud 40, and the bar 37, will be under compression. This results from the fact that the pivot 34, is always approaching stud 40, during lowering movement of the section. Now as the sections ascend toward a restored position, the pivot 34 will move continuously toward the left of Figs. 2 to 4. At this point, it may be informative to state, that during descent of the sections 10 and 11, toward a dumping position, the total collective length of the sections is always being reduced, while during ascent of the sections toward a normal position, their collective length is being increased. Now, therefore, as the sections 10 and 11 are being restored from the position shown in Fig. 2, and as the pivot 34 moves far enough to the left, the lost motion will be taken up, and the bar 37 will move to the left until arrested by the right hand end of slot 39, whereupon, the toggle links 33 and 35, will be straightened as shown in Fig. 3, and as the pivot 34 moves further, the toggle links 33 and 35, will again pass over dead center into the position shown in Fig. 4. This movement will again shift bar 37, into a position to the right, until the left hand end of slot 39, again fulcrums against stud 40, as shown in Fig. 4. Thus, in most all of the movement, bar 37, is under compression tending to retain the toggle against collapse, which serves to retain the ends 31, in sufficiently lowered relation to the floored end of section 10, such as will permit said floored end to occupy a higher position during such ascent than the ends 31, of the arms 20. This is the reason why the chamfered ends 26 and 27, will occupy the position shown in Fig. 4, during ascent, so that as the sections are collectively lengthened, the ends 26 and 27 will be in a position to seat on the tops 9, of beams 5.

I will next describe the truck or wagon holding mechanism, and the coaction of the latter with said sections in the performance of the safety function.

This mechanism is shown in the form of a U-shaped device consisting of limbs 44 which are hinged at 45 to rod 16, and which are connected with a bight member 46, preferably in the form of a rod, extending transversely across section 11. I preferably groove section 11, at 47, so that when said mechanism is in a non-vehicle holding position, it or said rod will lie flush with the top of said section. The spaces 48, between section 11, and frame members 8, serve to receive the limbs 44. The length of bar 46, is sufficient to extend across the rear peripheral treads of the front wheels of a vehicle, to hold the latter. In practice, the truck or wagon is advanced into position on section 11, and then the rod 46, is raised as shown in Figs. 1 and 2.

Now it will be clear that I do not injure the wheels and spokes by this means of anchorage, as would be the case if chains or other means were employed, and this holds good as far as the tires of the wheels are concerned. It will also be clear that as this vehicle holding mechanism moves into effective position about a fixed axis, namely rod 16, it will never change its position longitudinally of the section 11, hence, wagons and trucks of all lengths of wheel base will always be held in the same position on section 11. This uniformity of position, in the present construction, is one wherein the front wheels are closely adjacent the elevating end 14 of section 11. In practice, this end is only elevated about three feet from the ground, hence, in the case of horse drawn vehicles, I do not have to unhitch the horses when the wagon is tilted into the position shown in Fig. 2. This is a great advantage, as will be obvious from its mere statement, and which is not possible with any other dumping platform known to me.

A further advantage residing from a single dumping platform, which is also a weighing platform, is that when the vehicle is once in position to be weighed, it remains in such position, throughout the weighing and dumping operations. In all other constructions known to me, and by reason of the fact that the dumping platform does not extend to the end of the runway, it is first necessary, in a horse drawn way, to advance the vehicle until the horses are off from the platform, to first get the total weight. Then they must back up, until the front wheels are again on the dumping platform. This is true in first weighing the whole load, wagon and all. Then, after dumping, it is necesary to weigh the wagon empty, and of course they must again advance the team off the platform.

Now by reference to Figs. 8 and 9, it will be seen that when the limbs 44, are in an elevated position, they are out of engagement with ends 31, and that when said limbs are in a horizontal position, as in Fig. 8, they are in engagement with ends 31. Now on each limb 44 is a retainer 49, the free end 50, of which, is adapted to underlap the connector 32, when the holding mechanism is in the position shown in Fig. 8. In view of this engagement, the end 31, of beam 20, could not descend, and hence, the clearance section 10 could not move into the position shown in Figs. 2 to 4, from the position shown in Fig. 1. Thus, before the elevating means can be employed at all, the wagon or truck must be engaged by the holding mechanism. This safety feature would preclude the possibility of the truck or wagon sliding down into the pit, which accidents have actually happened with other devices because they could be operated to tilt the vehicle into a dumping position before the vehicle was anchored in place.

I have shown a simple means for rigidly securing the holding mechanism in its adjusted functioning position, reference being had to Figs. 2, 6 and 11.

The limbs 44, are each provided with a series of adjusting holes 51. A bolt 52, for each limb, is slidably mounted in a groove 52', and is held by staples 53 in the groove. As the mechanism is manually or otherwise lifted to the desired position behind the front wheels, the bolts 52, on both sides, will be inserted into one of the holes 51, and thus the limbs will be securely held in position. Worm or chain means, as desired, may be substituted for the bolts shown, the idea being to broadly claim means on the tilting platform for holding the mechanism in position.

Reference will next be made to the means for tilting and holding the supporting section 11 in various positions.

Referring to Figs. 2, 5 and 7, I will describe an elevating means which consists of two units, the frame of one of which is designated at 54, and the frame of the other of which is shown at 55. The frame 54, is journalled in bearings 56, mounted on beams 6 and 7, and frame 55 is mounted in like bearings 57, also mounted on said beams. Thus, the frames are mounted to tilt to different positions as the section 11 is elevated or lowered. An elevated rod 58, having a threaded portion 59, is shown pivoted at its upper end 60, to a rod 61, mounted in beams 12. The threaded portion 59, extends loosely through frame 54, and into a tubular protector 62, which is threaded into the lower portion of frame 54. A gear 63, is interposed between thrust bearings 64 and 65, and is in threaded engagement with the portion 59, of rod 58. Thus, as gear 63, is turned in one or the other direction, rod 58 is either elevated or lowered. A driving shaft 66, is journalled in frame 54, and may be motor or hand driven, as desired, a crank 67, being shown on said shaft. A gear 68, mounted on said shaft meshes with gear 63. A driven shaft 69, has one end journalled in frame 54, and the other end journalled in frame 55, and on the first named end is a gear 70, meshing with gear 63. On the opposite end is a gear 71, meshing with gear 72, the latter driving rod 73, in a manner identical with the manner in which rod 58 is driven, or rather longitudinally actuated. Rod 73, has its upper end pivoted at 74, to rod 75, which latter is secured to beams 12, as shown. The lower end of rod 73, is sheathed by a tube 76, in a manner identical with tube 62.

Having specifically described the operation in detail, I will now broadly recapitulate by generally referring to the parts as regards general functions rather than to specific details of operation.

It is desired first to point out that rod 16 constitutes the major or primary axis about which both the platform and clearance sections 11 and 10, respectively, move. This necessarily follows from the fact that rod 16 is a fixed axis. Pivot 28, is the secondary axis, and while the clearance section 10 is moving bodily about axis 16, it also negotiates secondary movement about pivot 28, as has been heretofore fully explained. This secondary movement of section 10, about pivot 28, is not the free gravity movement that section 10 would take, if unrestrained, it is rather a prescribed and definite movement controlled and governed by the toggle mechanism, both as regards movement toward a dumping position and the restoring movement from a dumping position.

One of the most important features of my invention is the total avoidance of a plurality of dumping platforms, one for long trucks and one for short wagons, and it will also be clear that no platform extensions are necessary. By reason of this fact, I can drive the shortest wagon onto my combined weighing and dumping platform and anchor the front wheels closely adjacent elevating end 14. Thus, the team is to the right of end 14, in Fig. 1, and only the wagon is being weighed with its load. The team is not even unhitched from the wagon. After the wagon and its load has been weighed, and while it is still locked in its original position, the platform 11 can be actuated and the load dumped, and then the platform can be restored so that the empty wagon can be weighed, then the wagon can be released, and all during these operations, the wagon has not been moved from its initially locked position.

This would not be true if I employed two dumping platforms because the shorter platform would not extend as far as end 14, and hence, it would first be necessary to advance the wagon with the front wheels near enough to end 14, which would be onto the long platform, in order that the hind legs of the team should be off the scales. Then, the wagon could be weighed. After weighing, it would be necessary to back the team to get the wagon onto the short section and anchor it, so that the wagon could be dumped. This is inevitable, where two platform sections are employed.

It will now be clear that as the crank 67, is actuated, the section 11, will not only be tilted, but will be held in the position to which it has been moved, owing to the threaded connection of the gears 63 and 72, with the rods 58 and 73, respectively.

I claim:—

1. Combined truck and wagon dumping platform structure, comprising a tiltable platform, and a U-shaped bar structure having its limbs hinged to said platform and adapted to be elevated behind the front wheels with the bar of said structure in engagement with the rear peripheral portions of said front wheels to hold the vehicle when the platform is tilted.

2. Combined truck and wagon dumping platform structure, comprising a tiltable platform, and vehicle holding mechanism locking said platform against tilting movement when said mechanism is in a non-vehicle holding position and releasing said platform for tilting movement when said mechanism is in a vehicle holding position.

3. Combined truck and wagon dumping platform structure for dumping the contents of a loaded vehicle into a subjacent pit, comprising a run-way body composed of normally horizontally alined slotted clearance and tiltable platform sections movable about a single fixed supporting axis on which latter the loaded vehicle is supported, and mechanism for tilting said platform section into a dumping position and lowering said clearance section into superposed relation to said pit and into intercepting relation with the discharging contents from said vehicle.

4. Combined truck and wagon dumping platform structure for dumping the contents of a loaded vehicle into a subjacent pit, comprising a run-way body composed of normally horizontally level clearance and platform sections tiltable about an axis forwardly disposed with respect to the rear wheels of the vehicle, and mechanism for tilting said platform section into a dumping position and shifting said clearance section out from contact with the descending rear end of the vehicle.

5. Combined truck and wagon dumping platform structure for dumping the contents of a loaded vehicle into a subjacent pit, comprising a run-way body composed of normally horizontally alined clearance and platform sections tiltable about an axis forwardly disposed with respect to the rear wheels of the vehicle, said clearance section extending over the pit and forming the initial section over which the vehicle is run to reach said platform section, and mechanism for tilting said platform section to dump the contents of the vehicle into said pit and shifting said clearance section to permit descent of the rear end of the vehicle toward said pit.

6. Combined truck and wagon platform pumping structure, comprising a run-way body composed of a clearance and a tiltable platform section on which latter the loaded vehicle is carried, and vehicle holding mechanism on said tiltable section coacting with said clearance section for holding said platform section against tilting movement when said mechanism is in a non-vehicle holding position and releasing said clearance section for freeing said platform section to tilt when said mechanism is in a vehicle holding position.

7. Combined truck and wagon dumping platform structure, comprising a platform section mounted to tilt about an axis, a clearance section pivotally supported by said platform section, and link mechanism connected with said sections and with a stationary part for altering the movement of said clearance section while the latter is being operated by tilting movement of said platform section.

8. Combined truck and wagon dumping platform structure, comprising a platform section mounted to tilt about an axis, a clearance section pivotally supported by said platform section, and link mechanism pivoted to and coacting with said clearance section and having lost motion connection with a stationary part for altering movement of said clearance section while the latter is being operated by tilting movement of said platform section.

9. Combined truck and wagon dumping platform structure, comprising platform and clearance sections jointly forming a run-way body, said platform section being mounted to tilt about an axis and said clearance section being pivotally hung from said platform section to be actuated as the latter is tilted, and mechanism for tilting said clearance section above the descending end of said platform section and maintaining such relation in the final dumping position and in the restoring movement and finally releasing said clearance section for movement into alined relation with said platform section to form a run-way body.

10. Combined truck and wagon dumping platform structure, comprising a platform section tiltable about a fixed rod, a clearance section having a platform portion forming with said platform section a run-way body, said clearance section having beams extending along opposite sides of said platform section to points adjacent said rod, and said beams being pivotally supported between their ends on said platform section, a vehicle holding mechanism including limbs pivoted to said rod and having means engaging the free ends of said beams when said mechanism is in a non-vehicle holding position to lock said sections against tilting movement and releasing said beams when moved into a vehicle holding position.

11. Combined weighing and dumping platform structure, including a single tiltable platform for supporting vehicles of different length, and means for anchoring a relatively long truck or a relatively short wagon in a single fixed position on said platform irrespective of the length of said wagon or truck and holding the same thereon to first weigh the vehicle and its load, and means for actuating said platform to dump the load, and finally restore the empty vehicle to be weighed while the vehicle is in its initial locked position on said platform.

12. Combined truck and wagon dumping structure, comprising a vehicle run-way composed of a clearance section and a platform section, the latter beoing tiltable about a fixed axis, said clearance section being pivotally mounted on said platform section and having an actuating portion extending past said pivotal mounting, and means connected with said actuating portion and altering movement of said clearance section about its pivotal mounting as said clearance section moves about said fixed axis of said platform section.

13. Combined truck and wagon dumping platform structure, comprising a platform section mounted to tilt about an axis, a clearance section pivotally supported by said platform section, and link mechanism connected with one of said sections for altering the movement of said clearance section as the latter is moved by tilting action of said platform section.

In testimony that I claim the foregoing as my own, I hereby affix my signature.

JOSEPH UKLENKOTT.